(No Model.)

C. E. WESTCOTT.
EAR RING.

No. 320,991. Patented June 30, 1885.

WITNESSES:

INVENTOR:
Charles E. Westcott
by Edson Salisbury Jones
Attorney

UNITED STATES PATENT OFFICE.

CHARLES E. WESTCOTT, OF PROVIDENCE, RHODE ISLAND.

EAR-RING.

SPECIFICATION forming part of Letters Patent No. 320,991, dated June 30, 1885.

Application filed May 1, 1885. (No model.)

*To all whom it may concern:*

Be it known that I, CHARLES E. WESTCOTT, of the city and county of Providence, and State of Rhode Island, have invented a new and useful Improvement in Ear-Rings; and I do hereby declare the following specification, when taken in connection with the accompanying drawings, forming a part of the same, to be a description thereof.

This invention consists in an ear-ring having its shank or wire provided with a circumferential shoulder, and having a back or fastening member provided with a hole of less size than that portion of the shank immediately forward of said shoulder, and with spring-arms radiating from said hole and integral with the material of the back member, whereby said member may be applied to and withdrawn from the shank, and by the engagement of its spring-arms with the shoulder on the shank hold the ear-ring in place.

It also consists in making that part of the shank between the shoulder and its free end of such length that when the back or fastening member is in place said free end will engage the interior back wall of said member and prevent it from materially canting downward, as will hereinafter appear.

Figure 1:
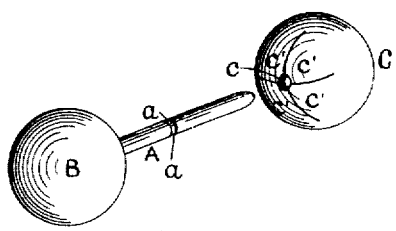
Figure 2:
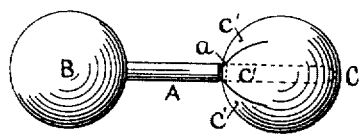
Figure 3:
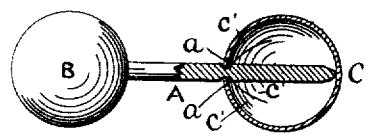
Figure 4:
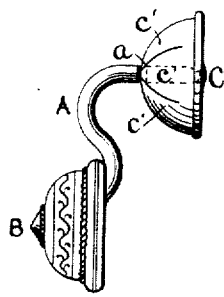

In the accompanying drawings, Figure 1 represents in perspective an ear-ring embodying the invention, the back or fastening member being detached. Fig. 2 shows a side view of the same with the fastening member in place. Fig. 3 represents the same, partially in section. Fig. 4 represents a side view of an ear-ring having a curved shank with the fastening member in place.

A is the shank or wire of the ear-ring, which may be straight, as shown in Figs. 1, 2, and 3, or of other form, as shown in Fig. 4.

To one end of the shank a head, B, of any preferred form, is secured, and the shank is furnished with a groove or depression which produces a circumferential shoulder, $a$. The back or fastening member C is shown in Figs. 1, 2, and 3 in the shape of a hollow ball. This member has a hole, $c$, of less size than that part of the shank immediately forward of the shoulder, $a$, and is slitted to produce spring-arms $c'$, which radiate from the hole and allow the hole to expand when the member is applied to and removed from the shank, and by engagement with the shoulder $a$ hold said member locked on the shank.

The length of the shank A between its shoulder $a$ and its free end is preferably such that when the member C is locked in place the free end of the shank will be in contact with the interior back wall of said member, as shown in Fig. 3, and thereby prevent the member from materially canting downward, as will be readily understood.

The member C, instead of being in the form of a ball, as shown in Figs. 1, 2, and 3, may be of other forms, such, for instance, as shown in Fig. 4.

The means for fastening the ear-ring in place are simple and inexpensive in construction and effective in action.

What I claim, and desire to secure by Letters Patent, is—

1. As an improved article of manufacture, an ear-ring having its shank or wire provided with a circumferential shoulder, $a$, and a fastening member, C, having a hole, $c$, of less diameter than that portion of the shank immediately forward of said shoulder, and spring-arms $c'$ integral with the material of the fastening member and radiating from the hole therein, substantially as set forth.

2. The combination, with the fastening member C, having an expansible hole, $c$, in its wall or body, and integral spring-arms $c'$, radiating from said hole, of the shank A, having a circumferential shoulder, $a$, and of such length between said shoulder and its free end that said end will engage the interior back wall of the fastening member when the latter is locked in place on the shank, substantially as set forth.

CHARLES E. WESTCOTT.

Witnesses:
EDSON SALISBURY JONES,
HENRY J. STAPELTON.